United States Patent [19]
Tsukamoto

[11] Patent Number: 4,651,947
[45] Date of Patent: Mar. 24, 1987

[54] TENSION LOCKING MECHANISM OF A RETRACTOR

[75] Inventor: Masahiro Tsukamoto, Fujisawa, Japan

[73] Assignee: NSK-Warner K. K., Tokyo, Japan

[21] Appl. No.: 742,849

[22] Filed: Jun. 10, 1985

[30] Foreign Application Priority Data

Jun. 19, 1984 [JP] Japan .............................. 59-90211[U]
Jan. 10, 1985 [JP] Japan ................................ 59-880[U]

[51] Int. Cl.⁴ ....................... A62B 35/00; B65H 75/48
[52] U.S. Cl. ................................ 242/107.7; 242/107.6
[58] Field of Search .......................... 242/107.6, 107.7; 280/807; 297/477

[56] References Cited

U.S. PATENT DOCUMENTS

| | | | |
|---|---|---|---|
| 3,957,223 | 5/1976 | Colasanti et al. | 242/107.6 |
| 3,973,786 | 8/1976 | Rogers, Jr. | 280/747 |
| 4,023,746 | 5/1977 | Magyar | 242/107.7 |
| 4,065,072 | 12/1977 | Magyar | 242/107.7 |
| 4,373,684 | 2/1983 | Naito | 242/107.6 |
| 4,387,862 | 6/1983 | Sakurada et al. | 242/107.6 |
| 4,391,421 | 7/1983 | Naitoh et al. | 242/107.7 |
| 4,506,845 | 3/1985 | Tsukamoto | 242/107.7 |

OTHER PUBLICATIONS

Japanese Laid Open U.M. Appln. No. 124546/1984, Aug. 22, 1984, Tension Locking Mechanism of a Retractor.

Primary Examiner—Stuart S. Levy
Assistant Examiner—Joseph J. Hail, III
Attorney, Agent, or Firm—Shapiro and Shapiro

[57] ABSTRACT

A tension locking mechanism of a retractor has a webbing take-up reel rotatably supported on a base, a take-up spring for biasing the take-up reel in a webbing take-up direction, a ratchet member formed integrally with the take-up reel, a latch member adapted to assume a latching position for preventing rotation of the ratchet member and a non-latching position for permitting rotation of the ratchet member, latch member control means for controlling the positions of the latch member, holding means adapted to sense a predetermined movement of a seat occupant and be electrically operated to hold the latch member in the non-latching position, and auxiliary means for imparting an auxiliary force when releasing the holding of the latch member in the non-latching position by the holding means.

7 Claims, 29 Drawing Figures

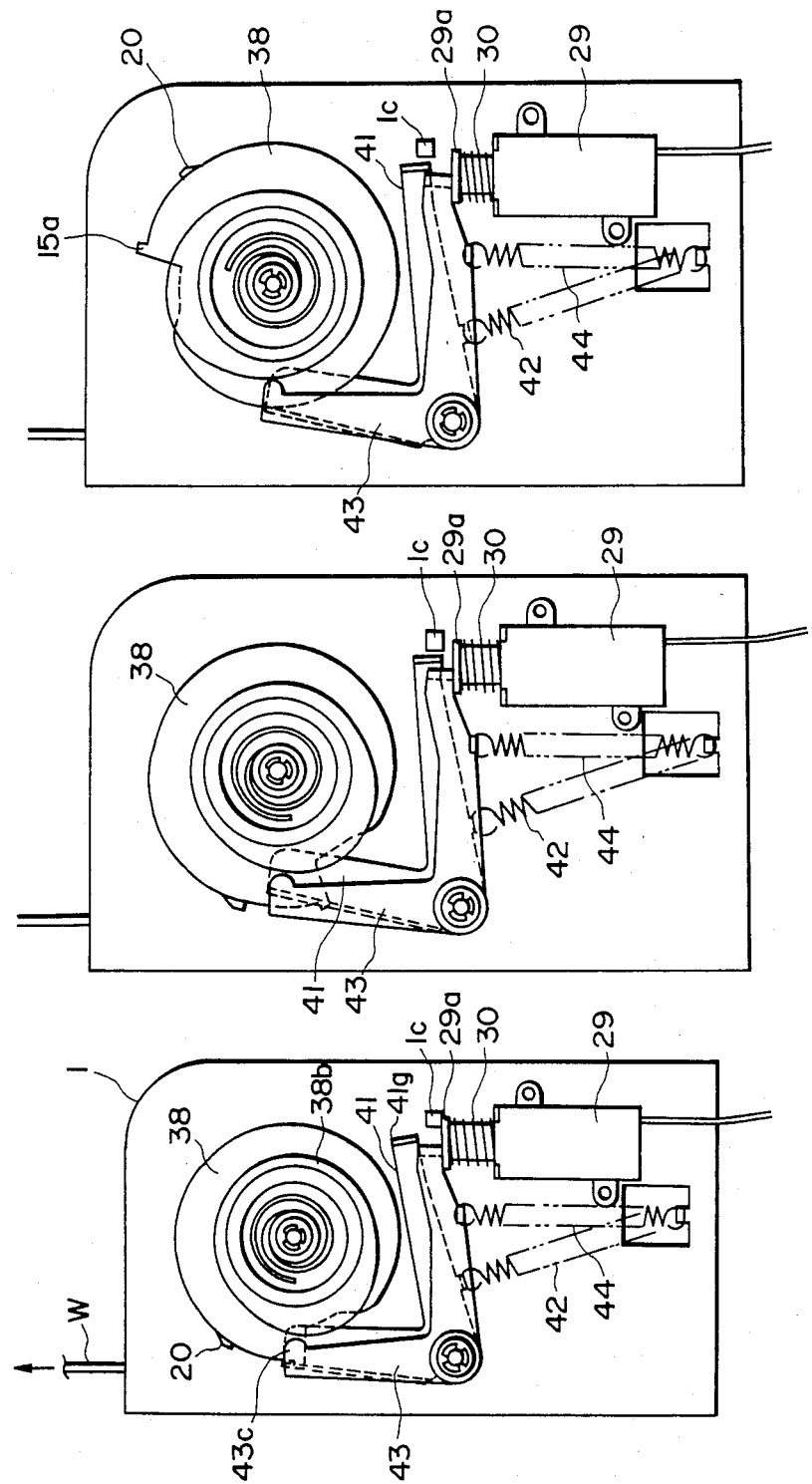

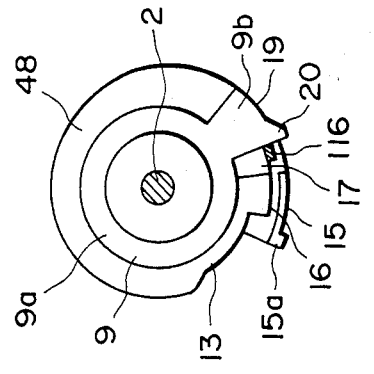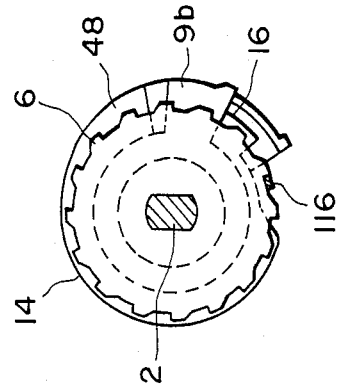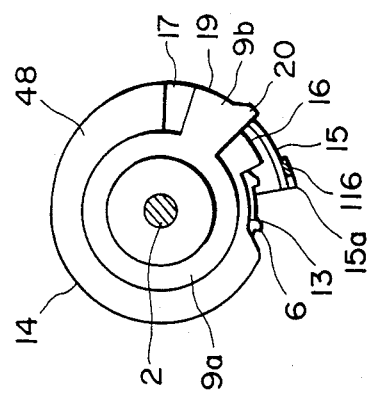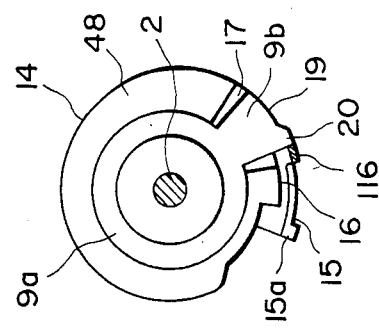
FIG. 22
FIG. 23
FIG. 24
FIG. 25

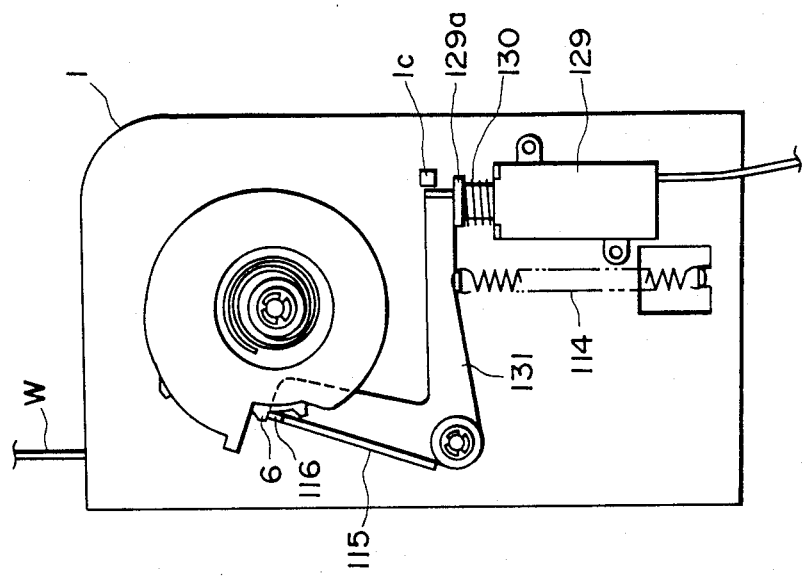
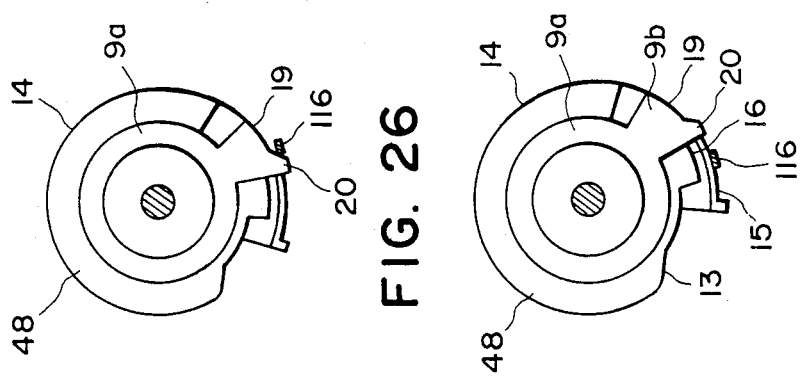
FIG. 28
FIG. 26
FIG. 27

TENSION LOCKING MECHANISM OF A RETRACTOR

BACKGROUND OF THE INVENTION

1. Field of the Invention

This invention relates to a tension locking mechanism of a retractor, and more particularly to a tension locking mechanism for locking and unlocking a webbing take-up force by electrical control means utilizing a solenoid.

2. Description of the Prior Art

There is generally known a tension locking mechanism of a retractor which uses cam means to cause a latch member to be engaged with a ratchet member integral with a webbing take-up reel to thereby lock a webbing take-up force after a predetermined series of webbing wearing operations. However, such a tension locking mechanism using cam means has suffered from a disadvantage that when it is desired to recover the webbing take-up force and take up webbing onto the take-up reel, the take-up force is not restored unless a predetermined webbing operation is effected. Such an operation is extremely cumbersome.

So, there is conceived a method which uses electrical means such as a solenoid to immmediately recover the take-up force by a simple webbing removing or releasing operation. In this case, however, when the solenoid becomes deenergized, a plunger is moved by a spring of a considerable spring force to bring the latch member to its non-latching position to thereby recover the take-up force and thus, subsequently, the plunger is returned to its original position by the energized solenoid against said considerable spring force, whereafter the latch member is brought to its latching position to thereby lock the take-up force. Therefore, the force which the plunger receives upon energization of the solenoid is required to be great, and this necessarily leads to a disadvantage that the solenoid becomes bulky and expensive.

SUMMARY OF THE INVENTION

It is therefore an object of the present invention to overcome the above-noted disadvantages and to provide a tension locking mechanism which uses a solenoid to forcibly unlock the take-up force but permits the solenoid to be small to the utmost.

The construction of the present invention which can achieve the above object consists in a tension locking mechanism of a retractor having a webbing take-up reel rotatably supported on a base, a take-up spring for biasing said take-up reel in a webbing take-up direction, a ratchet member formed integrally with said take-up reel, a latch member adapted to assume a latching position for preventing rotation of said ratchet member and a non-latching position for permitting rotation of said ratchet member, latch member control means for controlling the positions of said latch member, holding means adapted to sense a predetermined movement of a seat occupant and be electrically operated to hold said latch member in said non-latching position, and auxiliary means for imparting an auxiliary force when releasing the holding of said latch member in said non-latching position by said holding means.

According to the above-described construction of the present invention, design is made such that the latch member is forcibly brought to its non-latching position by control means such as a solenoid while, on the other hand, design is made such that the energization force of the solenoid is assisted by an auxiliary force when a plunger is to be moved by the energization force and therefore, it is not necessary to make the solenoid bulky and a retractor with a tension locking mechanism which is compact and simple as well as economically excellent and readily operable can be realized.

BRIEF DESCRIPTION OF THE DRAWINGS

FIGS. 16 to 20 are side views showing the operation of the second embodiment.

FIGS. 22 to 27 illustrate the operation of the third embodiment.

FIG. 28 is a side view corresponding to the state of FIG. 25.

DESCRIPTION OF THE PREFERRED EMBODIMENTS

A first embodiment of the present invention will hereinafter be described with reference to FIGS. 1 to 14.

Figure 1:
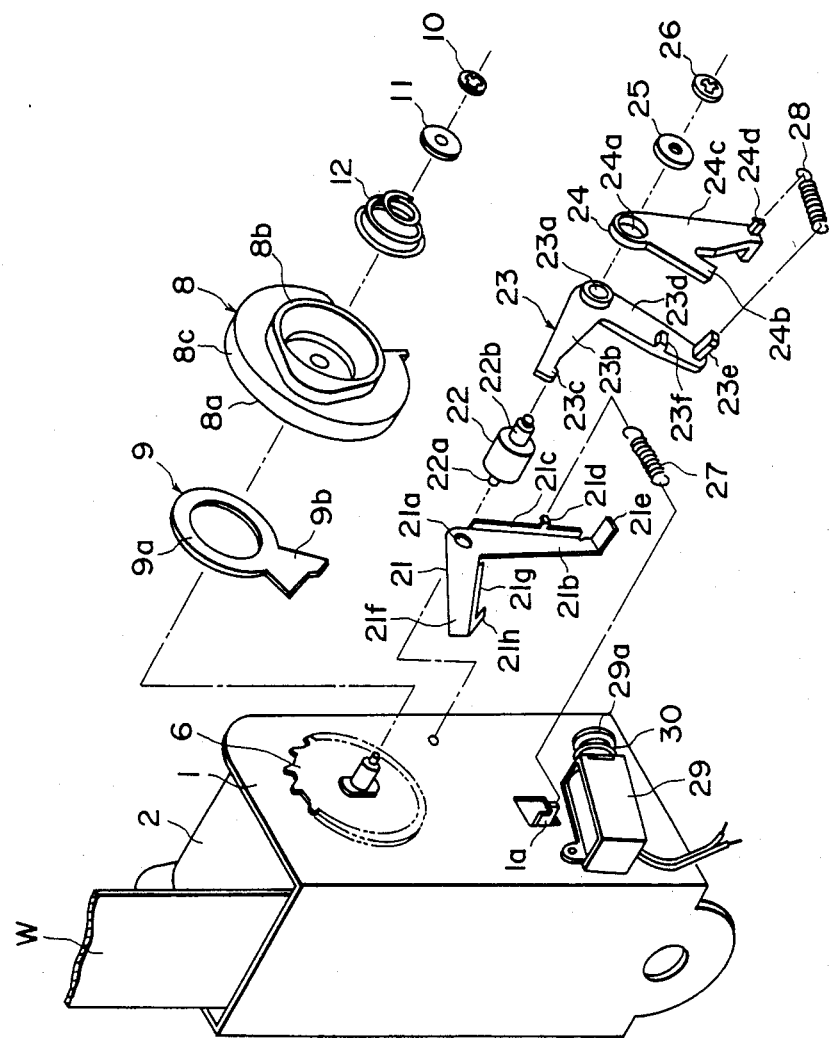
FIG. 1 is an exploded perspective view showing a first embodiment of the present invention.
Figure 2:
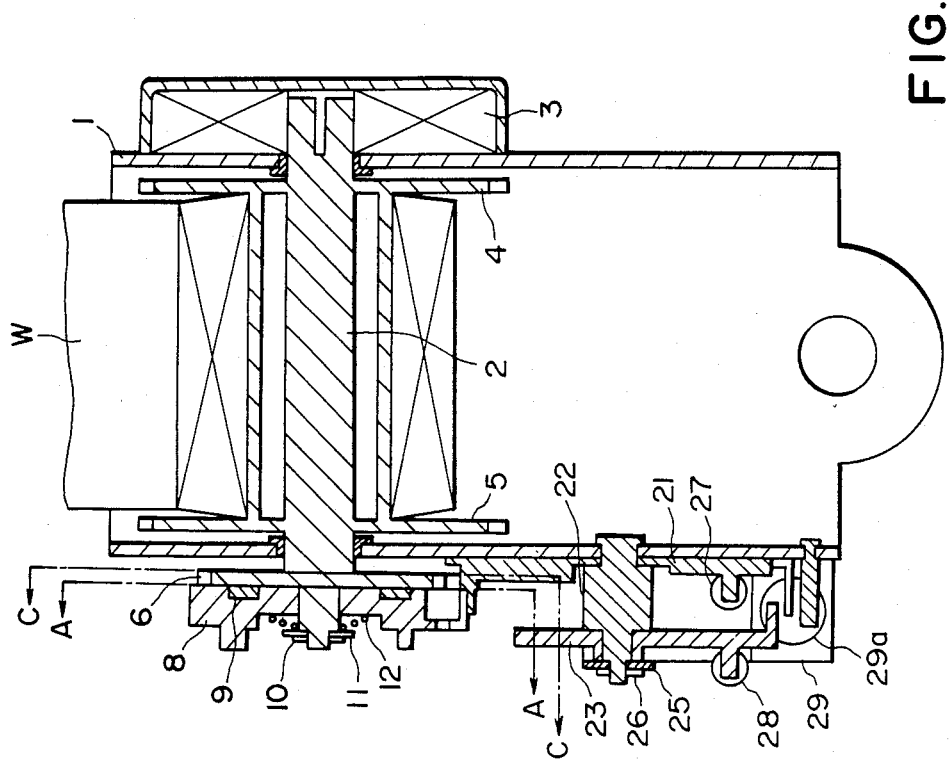
FIG. 2 is a front cross-sectional view of the retractor shown in FIG. 1.

As shown in FIGS. 1 and 2, a base 1 comprises a back plate portion of U-shaped cross-section having a mounting hole, and two side portions extending from the opposite ends of the back plate portion, and a take-up reel 2 for webbing W is rotatably supported between the two side portions. The take-up reel 2 has secured thereto one end of the webbing W and is biased in a webbing W take-up direction (a counter-clockwise direction as viewed in FIG. 1) by a take-up spring 3 restrained by the shaft end of the take-up reel 2. Inside the base 1 and near the opposite ends of the take-up reel 2, large ratchet wheels 4 and 5 having their engaging teeth facing in a webbing draw-out and rotation direction are formed integrally with the take-up reel 2. These ratchet wheels 4 and 5 come into mesh engagement with stoppers, not shown, to prevent rotation of the take-up reel 2 in the draw-out direction and safely restrain the belt wearer when an acceleration sensing mechanism, not shown, senses a predetermined speed change of the vehicle.

A ratchet wheel 6 as a ratchet member having on the outer periphery thereof a number of teeth each having the engaging surface thereof facing in the webbing W take-up direction is fixed to the outside of the base 1 on the shaft end opposite to the shaft end of the take-up reel 2 on which the take-up spring 3 is restrained. A control plate 8 having a cam surface on the outer periphery thereof and a clutch plate 9 rotatable in a predetermined range contained in a groove provided in the inner side surface 8a of the control plate 8 are disposed outside the ratchet wheel 6, and these control plate 8 and clutch plate 9 together constitute first control means. The control plate 8 is urged against the ratchet wheel 6 by a conical spring 12 disposed between a washer 11 held on a shaft by a snap ring 10 and the control plate 8, and is integrally held on the ratchet wheel 6 by the friction force between the control plate and the ratchet wheel 6.

The control plate 8 comprises an inner side surface 8a having a groove for receiving the clutch plate 9, an outer side surface 8b receiving the bottom surface portion of the conical spring 12 and having an outer peripheral cam surface, and an outer peripheral surface 8c having a complicated cam surface provided in the outer peripheral surface sandwiched between the inner side surface 8a and the outer side surface 8b. The clutch plate 9 comprises a central annular portion 9a and a leg portion 9b extending out from the outer periphery of the annular portion 9a while widening radially outwardly.

The inner side surface 8a of the control plate 8 has a groove somewhat deeper than the thickness of the clutch plate 9, and this groove comprises an annular portion receiving the annular portion 9a of the clutch plate 9 and a leg portion 17 receiving the leg portion 9b and having such a width that the leg portion 9b is movable by a predetermined amount and widening radially outwardly. The outer side surface 8b has a protrusion protruding outwardly from a planar portion, and a recess for receiving the bottom surface of the conical spring 12 is formed at the center of this protrusion. The outer peripheral surface of this protrusion is formed as a cam surface similar to the configuration of an egg in which the distance from the center gradually varies from a short-diametered portion to a long-diametered portion provided in opposed relationship therewith.

The outer peripheral surface 8c has complicated cam surfaces for guiding the latch pawl 21h of a latch arm 21 which will later be described. FIGS. 3 to 9 show views of the control plate 8 and the clutch plate 9 as seen from that side which contacts the ratchet wheel 6. The cam surfaces will now be described with reference to these Figures. A first cam surface 13 is a cam surface recessed inwardly of each tooth of the ratchet wheel 6, and the mesh engagement between the ratchet wheel 6 and the latch arm 21 is possible when the latch pawl 21h of the latch arm 21 is in this area. A second cam surface 14 has a diameter larger than that of the tooth top of the ratchet pawl 6, continues about half round in the clockwise direction (as viewed in FIGS. 3 to 9) of the first cam surface 13 substantially with the same diameter from the juncture portion with the first cam surface 13, and then gradually increases in its diameter and terminates at a point whereat it changes circumferentially by about ⅔ of one round. Forwardly of said point, the leg portion 17 of the aforementioned groove receiving the clutch plate 9 therein is provided, whereafter a third cam surface 15 is set. The third cam surface 15 is an outer peripheral surface of the same diameter as the diameter at the end of the leg portion 17 of the second cam surface 14 and has a portion thereof provided over the first cam surface 13 radially outwardly of the first cam surface. A projection 15a as a stopper is provided on the clockwise end portion of the third cam surface 15, and the portion ahead of the projection 15a is the area of the first cam surface 13. On the other hand, the counter-clockwise portion of the first cam surface 13 provides a fourth cam surface 16 having a mean diameter of the first cam surface 13 and the third cam surface 15 after the first cam surface 13 has terminated inside the third cam surface 15. The fourth cam surface 16 partly extends also into the leg portion 17 of the aforementioned groove.

Figure 4:
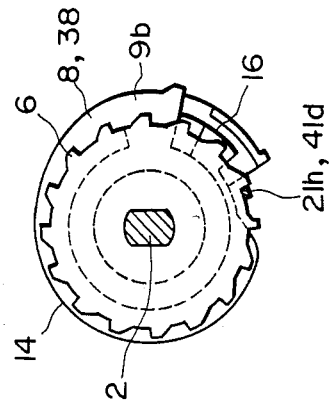
FIGS. 4 to 9 illustrate the operation of the first embodiment, FIG. 6 being a cross-sectional view taken along line C—C of FIG. 2.

As shown in FIG. 4, the clutch plate 9 is disposed in the groove of the control plate 8 and is displaceable circumferentially in the leg portion 17 between the second cam surface 14 and the third cam surface 15. The outer peripheral surface of the tip end of the leg portion 9b of the clutch plate 9 is also formed as a cam surface which, in the position of FIG. 4, comprises a fifth cam surface 19 forming a continuous surface when it contacts the second cam surface 14, and a projection 20 provided at the clockwise end of the fifth cam surface 19.

The cam surface formed on the outer peripheral surface 8c and the cam surface on the protrusion of the outer side surface 8b are disposed in such a relation that the long-diametered portion of the cam surface on the protrusion has been angularly displaced by about 180° with respect to the juncture portion between the first cam surface 13 on the outer peripheral surface 8c and the second cam surface 14.

Below the control plate 8, control means cooperating with the control plate 8, the clutch plate 9 and the ratchet wheel 6 to control the rotation of the take-up reel 2 is provided on a side surface of the base 1. This control means will hereinafter be described in detail.

The latch member 21, as shown in FIG. 1, is pivotably held on a shaft portion 22a extending out from one end of a shaft 22, and the shaft portion 22a is fixed on a side surface of the base 1. The latch member 21 is of a dog-legged shape, and a hole 21a formed in the bent portion thereof is fitted on the shaft portion 22a. The downwardly extending leg portion 21b of the latch member 21 has a flange 21c, which in turn has a protrusion 21d, and the distal end of the leg portion 21b provides an outwardly bent portion 21e. On the other hand, an arm 21f extending obliquely upwardly from the hole 21a is reinforced by a flange 21g and has at the tip end thereof a latch pawl 21h extending out from a side of the arm 21f. The arm 21f enters the gap between the ratchet wheel 6 and the base 1, and the latch pawl 21h protrudes so as to be engaged with the cam surface of the control plate 8 or a tooth of the ratchet wheel 6. In a state in which the whole amount of webbing W has been taken up, the latch pawl 21h is positioned on the fourth cam surface 16 as shown in FIG. 4. The opposite ends of a spring 27 are secured to the protrusion 21d on the flange 21c and the projection 1a provided on the base 1, and this spring normally biases the latch member 21 clockwise.

A shaft portion 22b extends out from the shaft end opposite to the shaft portion 22a, and a first arm 23 and a second arm 24 are pivotably fitted on the shaft portion 22b, and the outer side thereof is held by a washer 25 and a snap ring 26.

The first arm 23 also is of a dog-legged shape and a hole in a cylindrical portion 23 provided on the bent portion thereof is fitted on the shaft portion 22b. The arm portion 23b of the first arm 23 extends upwardly and is constructed such that a projection 23c provided at the tip end thereof bears against the outer peripheral cam surface of the protrusion 8b of the control plate 8 sideways of the control plate 8. The leg portion 23d of the first arm 23, as shown in FIGS. 10 to 14, extends obliquely downwardly from the bent portion and has a spring restraining projection 23e at the tip end thereof.

A stopper 23f is provided on the leg portion 23d between the projection 23e and the cylindrical portion 23a.

A hole 24a at the upper end of the second arm 24 is rotatably fitted on the outer peripheral surface of the cylindrical portion 23a of the first arm 23. The second arm 24 has an arm portion 24b extending in the same direction as the leg portion 23d of the first arm 23 and a leg portion 24c extending in the same direction as the leg portion 21b of the latch member 21, and the leg portion 24c also has a spring restraining projection 24d. The tip end of the leg portion 24c is bent toward the first arm 23 side.

A spring 28 is restrained between the spring restraining projections 23e and 24d of the first arm 23 and the second arm 24, and the second arm 24 is normally biased toward the first arm. The leftward displacement of the second arm 24 is prevented by the stopper 23f of the first arm 23, and whenever the projection 23c at the tip end of the arm portion lies on the short-diametered portion of the cam surface of the protrusion 8b, the second arm 24 bears against the stopper 23f and operates together with the first arm 23. When the projection 23c at the tip end of the arm portion 23b of the first arm 23 follows along the cam surface of the protrusion 8b, the first cam 23 pivots to the left and right as viewed in FIG. 10 and further, the second arm 24 also is caused to follow and pivot by the biasing force of the spring 28. The bent end 21e of the leg portion 21b of the aforementioned latch member 21 is bent away from the base 1 further forwardly of the inwardly bent portion of the tip end of the second arm 24. A solenoid 29 is downwardly inclined and fixed on the base 1 with the end of the plunger 29a thereof facing the inwardly bent portion of the tip end of the second arm 24 and the bent end 21e of the leg portion 21b of the latch member 21. The solenoid 29 is electrically controlled so that it is energized by a switch provided in a buckle when, for example, the tang of the webbing W and the buckle are brought into engagement with each other. The plunger 29a at the end of the solenoid 29 is normally biased outwardly by a spring 30 as biasing means. The solenoid 29 cannot overcome the biasing force of the spring 30 by only the attraction thereof when energized and the plunger 29a cannot intimately contact the solenoid 29. Accordingly, the plunger 29a is normally biased and pushed outwardly by the spring 30 and bears against a stopper 1b provided on the base 1.

When the force with which the solenoid 29 attracts the plunger 29a is $f_1$ and the biasing force imparted to the latch member 21 by the spring 27 is $f_2$ and the biasing force imparted to the second arm 24 by the spring 28 is $f_3$ and the biasing force of the spring 30 is $f_4$, the relation among these forces immediately after the engagement of the tang with the buckle is set so as to be $f_1+f_3>f_4>f_1, f_2, f_3$.

Operation of the present embodiment having the above-described construction will now be described.

FIG. 4 shows the manner in which the webbing has been taken up by the whole amount and is in its stand-by state. At this time, the clutch plate 9 is in a state in which the leg portion 9b thereof is pushed by the latch pawl 21h of the latch member 21 and bears against the end portion of the second cam surface 14 in the leg portion 17 of the groove of the control plate 8. In this state, the control plate 8 and the clutch plate 9 are prevented from rotating in the webbing W rewinding direction, i.e., in the clockwise direction as viewed in FIG. 4. At this time, the projection 23c at the tip end of the arm portion 23b of the first arm 23 bears against the short-diametered portion of the protrusion 8b.

Figure 8:
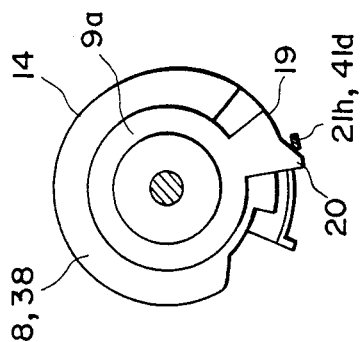
Figure 9:
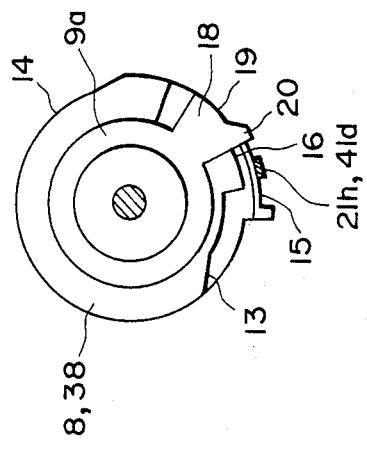
Figure 7:
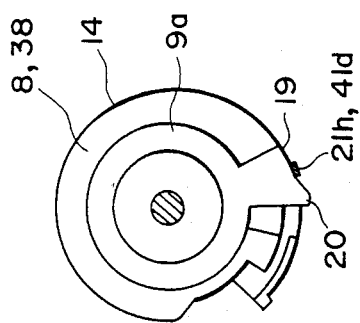

When the seat occupant draws out the webbing W from the state of FIG. 4 to wear it, the control plate 8 and the clutch plate 9 biased toward the ratchet wheel 6 by the spring 12 also rotate counter-clockwise as the ratchet wheel 6 fixed on the take-up reel 2 is rotated. The latch pawl 21h of the latch member 21 tries to drop from the fourth cam surface 16 to the first cam surface 13 as the control plate 8 rotates, but the bent end 21e of the leg portion 21b of the latch member 21 bears against the plunger 29a and the latch pawl 21h cannot pivot any further (that is, the biasing force $f_4$ of the spring 30 overcomes the biasing force $f_2$ by the spring 27) and therefore, the latch pawl 21h does not come into engagement with a tooth of the ratchet wheel, and thereafter it comes to bear against the second cam surface 14. After bearing against the second cam surface 14, the latch pawl 21h traces the fifth cam surface 19 on the clutch plate 9 and comes to the inclined surface of the projection 20 (the state of FIG. 7). By further draw-out of the webbing W, the latch pawl 21h pushes the projection 20 and rotates the clutch plate 9 clockwise. When the clutch plate 9 is displaced in the groove of the control plate 8 and the projection 20 strikes against the third cam surface 15, the latch pawl 21h moves up on the inclined surface of the projection 20 as shown in FIG. 8, and at last it rides over the projection 20 and comes onto the third cam surface 15 (the state of FIG. 9).

Figure 3:
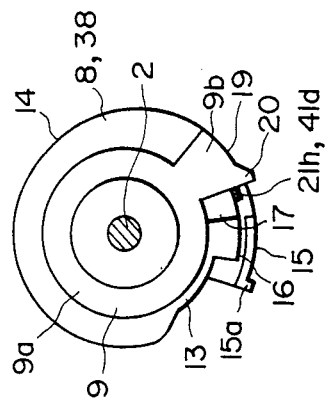
FIG. 3 is a cross-sectional view taken along line A—A of FIG. 2

When the webbing W is further drawn out, the latch pawl 21h comes into engagement with a projection 15a provided at the end of the third cam surface 15 (the state of FIG. 3). When the webbing W is further drawn out thereafter, the control plate 8 is prevented from rotating and only the take-up reel 2 is rotated, and this state continues until the tang and the buckle are engaged with each other.

Figure 10:
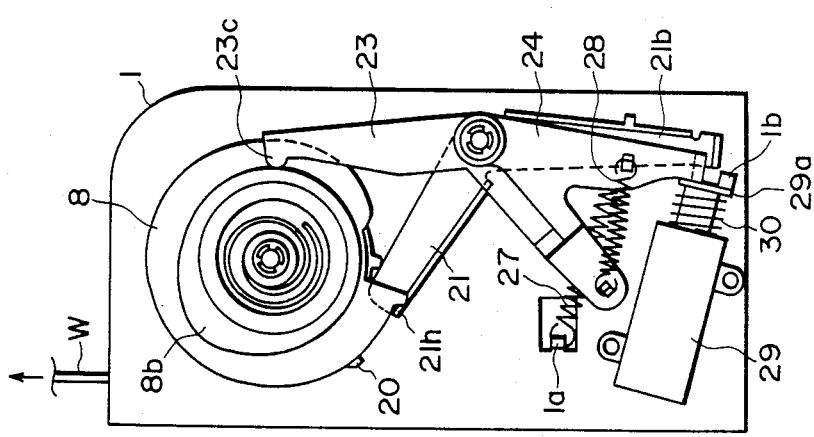

FIGS. 10 to 14 show a retractor as seen from its outside, i.e., that side opposite to FIGS. 3 to 9, and the state of FIG. 3 corresponds to FIG. 10.

Figure 11:
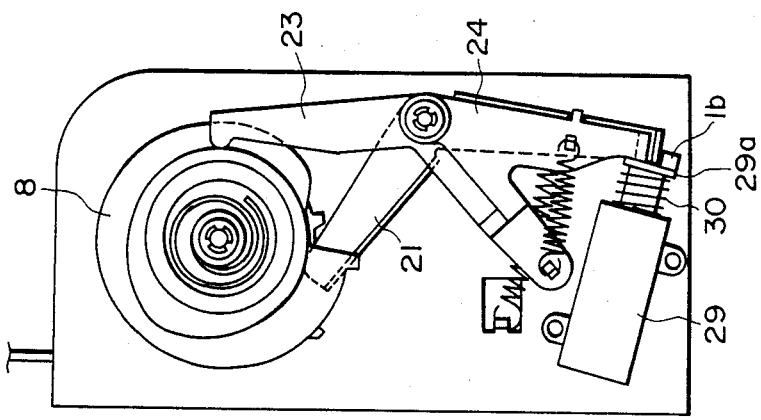

When the tang and the buckle are engaged with each other, a switch is operated and the solenoid 29 is energized, but since the biasing force $f_4$ of the spring 30 is greater than the attraction $f_1$ of the solenoid 29, the plunger 29a is biased by the spring 30 and remains in a position in which it bears against the stopper 1b. When the seat occupant assumes his regular seated posture after the engagement between the tang and the buckle, the webbing W is somewhat rewound, but at this time, the control plate 8 rotates in the webbing W take-up direction (clockwise direction as viewed in FIG. 3) with the take-up reel 2, that is, the latch pawl 21h traces the third cam surface 15 and the projection 20 of the clutch plate 9 comes to bear against the latch pawl 21h. When the projection 20 is urged by the latch pawl 21h, the clutch plate 9 is displaced counter-clockwise in the groove (the state of FIG. 5). Due to this displacement, the latch pawl 21h drops from the third cam surface 15 onto the fourth cam surface 16. Thus, the state of FIGS. 4 and 11 is restored.

Figure 6:
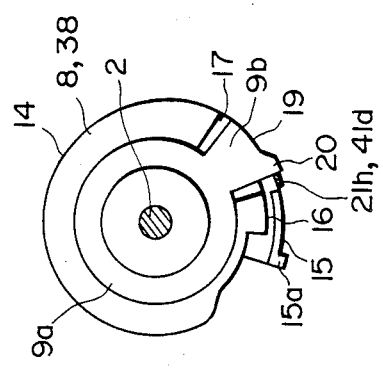
Figure 12:
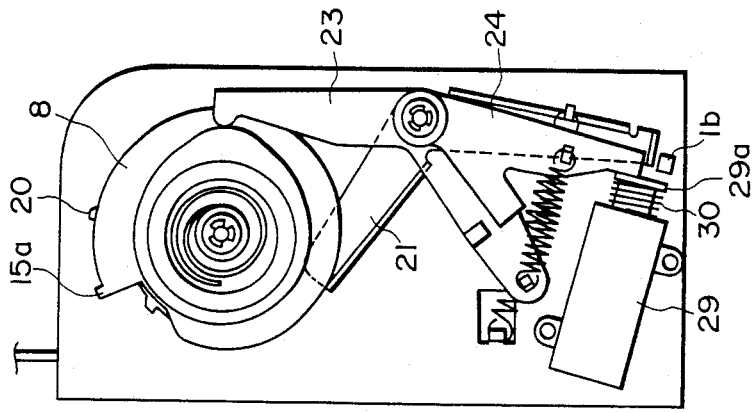
FIGS. 10 to 14 are side views also showing the operation of the first embodiment.
Figures 13, 14:
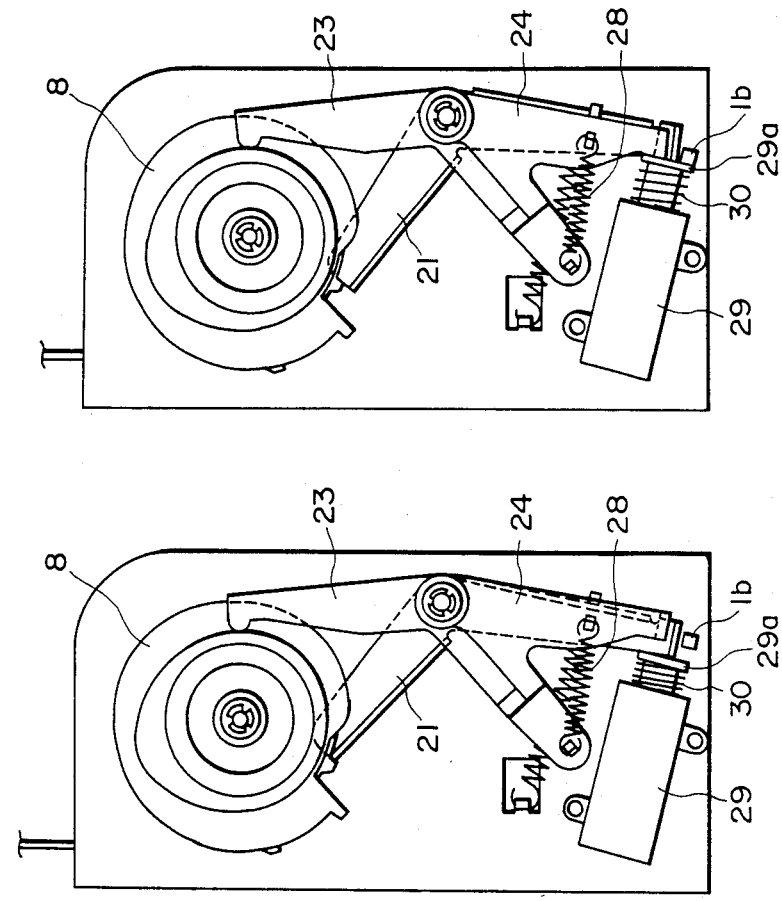

When, from this state, the seat occupant moves or draws out the webbing to endow the webbing with a slack, the latch pawl 21h traces the first cam surface 3 and the second cam surface 14 as during the aforementioned initial draw-out. However, when the projection 23c of the first arm 23 comes to the long-diametered portion of the protrusion of the control plate 8, the first arm 23 pivots on the shaft as shown in FIG. 12 and the leg portion 23d thereof is displaced away from the second arm 24. As a result, the second arm 24 is pulled by the spring 28 with the biasing force $f_3$ and therefore, the inwardly bent portion of the tip end of the leg portion 24c of the second arm 24 urges the plunger 29a toward the body of the solenoid 29. In this case, unlike the aforementioned initial webbing draw-out, the solenoid is in its energized state and therefore, the aforementioned biasing force $f_3$ of the second arm 24 by the spring 28 is added to the attraction $f_1$ of the solenoid and thus, the attraction of the solenoid overcomes the biasing force $f_4$ of the spring 30, so that the plunger 29a comes into intimate contact with the body of the solenoid. When the plunger 29a comes into intimate contact with the body of the solenoid 29, the attraction $f_1$ of the solenoid 29 overcomes the biasing force $f_4$ of the spring 30 and therefore, even if the biasing force $f_3$ by the second arm 24 is eliminated thereafter, the plunger 29a remains in intimate contact with the body of the solenoid (the state FIG. 12). As a result, the webbing W is again rewound and, when the latch pawl 21h drops from the second cam surface 14 onto the first cam surface 13, the leg portion 21b of the latch member 21 can now pivot clockwise as viewed in FIG. 2 without being blocked by the plunger 29a and thus, the latch pawl 21h comes into engagement with an outer peripheral tooth of the ratchet wheel 6 as shown in FIGS. 6 and 13.

Rotation of the take-up reel 2 in the rewinding direction is prevented by this engagement and therefore, the force of the take-up spring 3 is not applied to the seat occupant and a comfortable belt wearing state free of a sense of oppression can be obtained.

It is possible to draw out the webbing W from the state of FIGS. 6 and 13 and as the webbing W is drawn out, the latch pawl 21h traces the first cam surface 13, the second cam surface 14 and further the fifth cam surface 19, but if the draw-out force is exhausted, the state of FIG. 6 or 13 is again restored. Also, when the webbing is drawn out to such a degree that the latch pawl 21h rides over the projection 20 of the clutch plate 9, the latch pawl 21h comes into engagement with the projection 15a as shown in FIG. 3 similarly to the case of the aforementioned initial draw-out state and thus, only the take-up reel 2 is rotated.

If the draw-out force becomes exhausted from this state, the control plate 8 is also rewound with the take-up reel 2 and the latch pawl 21h urges the clutch plate 9, whereafter it drops onto the fourth cam surface 16 (the state of FIG. 4). In this state, the take-up force of the take-up spring 3 is biased by the webbing, which is thus ready to be taken up, and the slack of the webbing is taken up by the take-up reel 2. At this time, the relation of FIG. 4 is held and the latch pawl 21h holds the control plate 8 through the clutch plate 9 and therefore, the control plate 8 is not rotated.

When the seat occupant slightly draws out the webbing again, the latch pawl 21h drops into the first cam surface 13 and comes into engagement with a tooth of the ratchet wheel 6, and the above-described state of FIGS. 6 and 13 is restored. In this manner, the load to the seat occupant of the webbing take-up force in a predetermined length draw-out range of the webbing W can be blocked.

On the other hand, if the seat occupant releases the engagement between the tang and the buckle when he gets off the vehicle, the switch operates and the solenoid 29 becomes deenergized and therefore, the attraction $f_1$ of the solenoid becomes null, while the first arm 23 is in its most counter-clockwisely pivoted position with the projection 23c thereof being in contact with the short-diametered portion of the protrusion of the control plate 8, and the biasing force $f_3$ of the spring 28 becomes weak and therefore, the spring 30 pushes back the plunger 29a until the latter bears against the stopper 1b on the base 1. As a result, the engagement between the latch pawl 21h of the latch member 21 and a tooth of the ratchet wheel 6 is released so that the take-up force of the take-up spring 2 is imparted to the webbing.

A second embodiment of the present invention will now be described with reference to FIGS. 15 to 20. In the second embodiment, members substantially similar to those in the first embodiment are given similar reference characters and need not be described.

Figure 15:
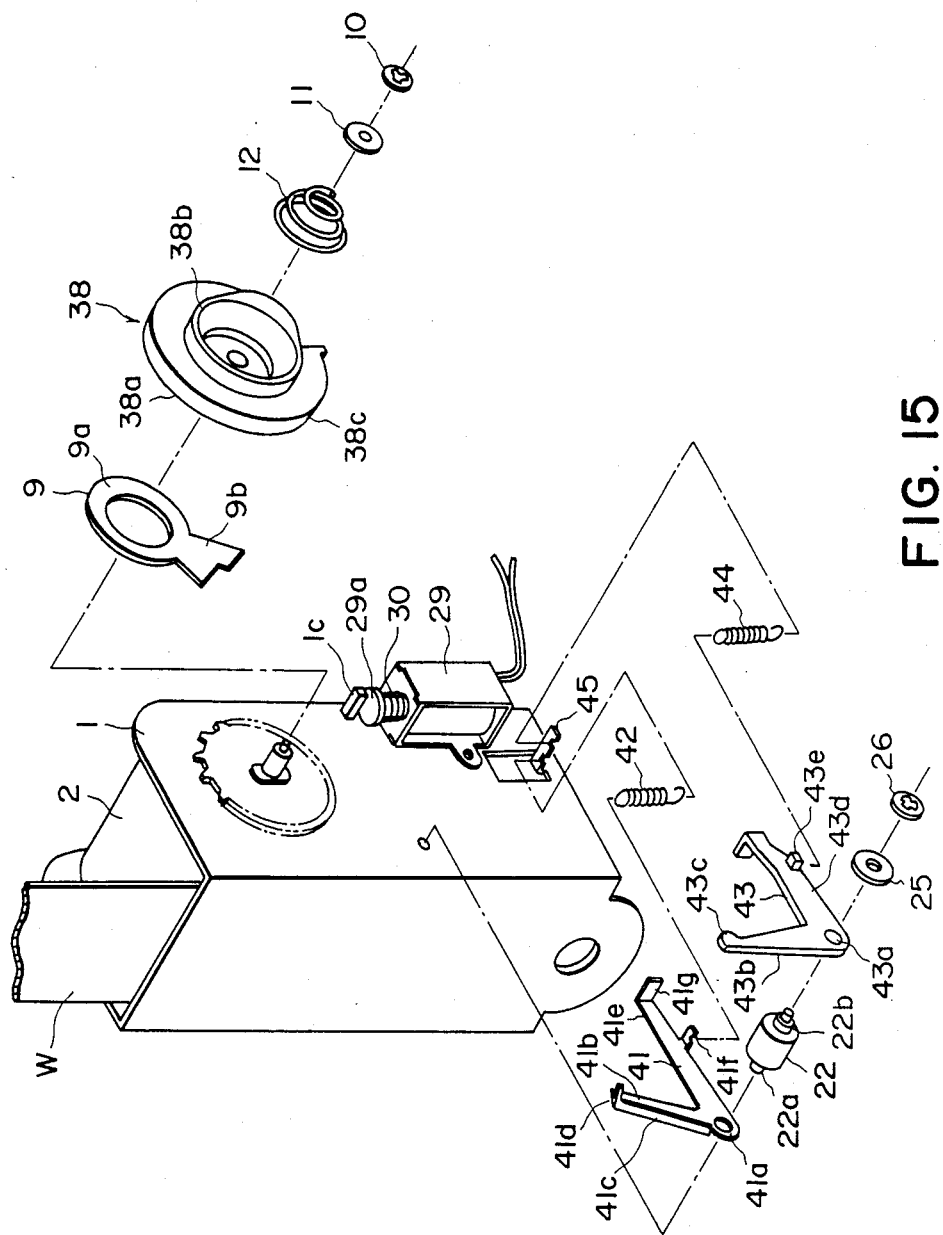
FIG. 15 is an exploded perspective view of a second embodiment of the present invention.
Figure 20:
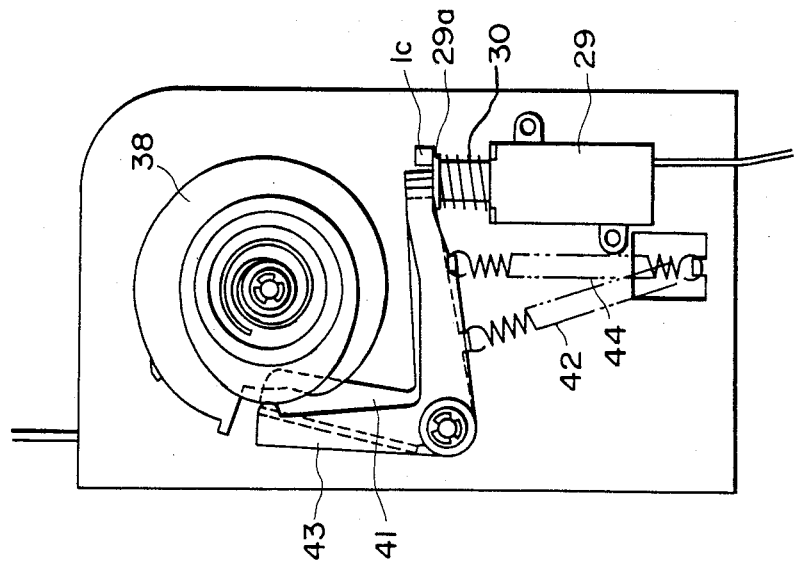
Figure 19:
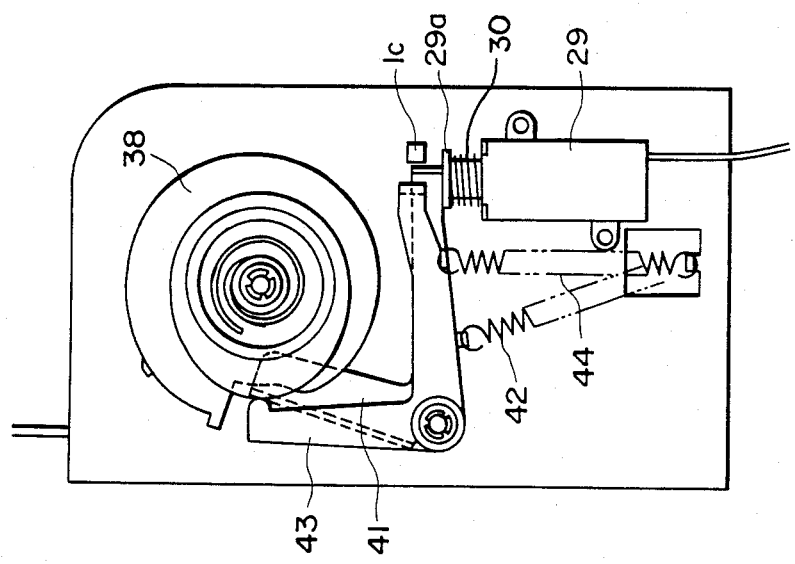

In FIG. 15, as in the first embodiment, a ratchet wheel 6, a clutch plate 9, a control plate 38, a spring 12, a washer 11 and a snap ring 10 are disposed outside the take-up reel 2. Only the control plate 38 differs from the control plate in the first embodiment, and the control plate 38 only has a protrusion of an outer side surface 38b in which the protrusion of the outer side surface 8b of the control plate 8 in the first embodiment has been rotated by about 180°, and the inner side surface and the outer peripheral surface thereof are the same as the inner side surface 8a and the outer peripheral surface 8c. The cam surface on the outer periphery of the protrusion of the outer side surface 38b is disposed with the long-diametered portion thereof facing the first cam surface 13.

An L-shaped latch member 41 is pivotably fitted on a shaft portion 22a at one end of a shaft 22 fixed to a side surface of the base 1 obliquely leftwardly below the control plate 38. The latch member 41 has in its L-shaped bent portion a hole 41a fitted on the shaft portion 22a, and comprises an arm 41b extending upwardly therefrom and a leg portion 41e extending substantially horizontally. The arm 41b comprises a planar portion extending into between the ratchet wheel 6 and the base 1, a flange 41c provided perpendicularly to the left side of the planar portion, and a latch pawl 41d projected from the flange at the tip end of the arm. The latch pawl 41d is in the position of FIG. 4 when the whole amount of the webbing has been taken up.

On the other hand, the leg portion 41e comprises a planar portion, a bent end 41g bent away from the base 1 at a right angle at the tip end of the planar portion, and a spring restraining projection 41f provided between the hole 41a and the bent end 41g. A spring restraining projection 45 is also provided on the base 1 below the projection 41f, and a spring 42 is disposed between the projections 41f and 45. Therefore, the latch member 41 is normally biased downwardly, i.e., clockwise, with a biasing force $f_2'$.

An arm 43 is pivotably fitted on the other shaft portion 22b of the shaft 22 with the outer side thereof being held by a washer 25 and a snap ring 26. The arm 43 also is L-shaped and comprises an upwardly extending arm portion 43b, a horizontally extending leg portion 43d and a hole 33 in the bent portion which is fitted on the shaft portion 22b. The arm portion 43b extends toward the cam surface on the outer periphery of the protrusion 38b of the control plate 38 and has its projection 43c in contact with the cam surface. The leg portion 43d has its tip end bent toward the base 1 inside the bent end 41g of the leg portion 41e of the latch member 41. A spring restraining projection 43e is also provided between the hole 43a and the bent portion at the tip end, and a spring 44 is disposed between this projection 43e and the projection 45 on the base 1. Accordingly, the arm 43 is normally biased downwardly, i.e., clockwise, by the spring 44 with a biasing force $f_3'$ and therefore, the projection 43c of the arm portion follows the cam surface on the outer periphery of the protrusion of the outer side surface 38b.

The solenoid 29 is uprightly fixed on the base with its plunger 29a facing upwardly and also facing the bent end 41g of the leg portion of the latch member 41 and the bent portion at the tip end of the arm 43. The plunger 29a is normally biased upwardly by the spring 30 with a biasing force $f_4'$, and bears against a stopper 1c provided on the base 1 and remains in that position.

When the attraction of the plunger 29a during the energization of the solenoid 29 is $f_1'$, the relation between the buckle and the tang immediately after the engagement therebetween is set so that $f_1'+f_3'>f_4'>f_1'$, $f_2'$, $f_3'$.

Operation of the second embodiment having the above-described construction will now be described.

The operation from the stand-by state of FIG. 4 in which the whole amount of the webbing W has been taken up until the webbing W is drawn out and the latch pawl 41d of the latch member 41 traces the cam surface on the outer peripheral surface 8c of the control plate 38 via the first cam surface 13, the second cam surface 14 and the fifth cam surface 19 (see FIG. 7), rides over the projection 20 of the clutch plate 9 (see FIG. 8), comes to the third cam surface 15 (see FIG. 9) and arrives at the distal projection 15a (see FIG. 3) is similar to what has been described in connection with the first embodiment. When the latch pawl 41d has assumed the state of FIG. 3, the latch member 41, the arm 43 and the control plate 38 are in the relation shown in FIG. 16. Even if the webbing W is further drawn out, rotation of the control plate 38 is prevented and the take-up reel 2 only rotates.

Figure 5:
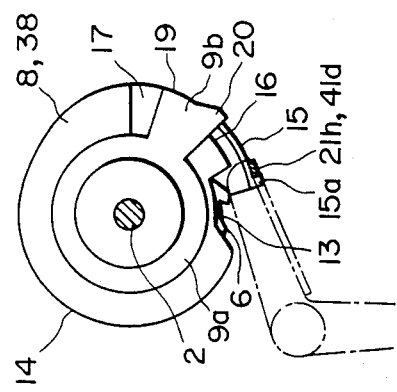

When the seat occupant inserts the tang into the buckle, the switch of the solenoid 29 is closed and the solenoid is energized. At this time, the plunger attraction $f_1'$ of the solenoid 29 is weaker than the biasing force $f_4'$, of the spring 30 and therefore, the plunger 29a remains in its initial position. When the seat occupant assumes his properly seated posture and the webbing W is slightly rewound, the latch pawl 41d pushes the clutch plate 9 as shown in FIG. 5 and drops onto the fourth cam surface 16 (see FIG. 6). At this time, the arm 43 is near the long-diametered portion of the protrusion of the outer side surface 38b and therefore, the biasing force $f_3'$ of the spring 44 is not loaded to the plunger 29a.

When the webbing is drawn out by movement or the like of the seat occupant, the latch pawl 41d comes to the first cam surface 13, whereupon the engagement thereof with a tooth of the ratchet wheel 6 is prevented by the plunger 29a bearing against the bent end 41g of the leg portion 41e. Further, when the latch pawl 41d goes over the first cam surface 13 and comes to the second cam surface 14, the tip end projection 43c of the arm 43 passes the long-diametered portion and comes to bear against the short-diametered portion and thus, the arm 43 imparts an urging force to the plunger 29a by the biasing force $f_3'$ of the spring 44. The sum of the attraction $f_1'$ of the solenoid 29 and the biasing force $f_3'$ of the spring 44 imparted to the arm 43 is loaded to the plunger 29a and the plunger 29a is attracted so as to come into intimate contact with the body of the solenoid 29 (the state of FIG. 18). That is, the state that $f_1'+F_3'>f_4'$ is achieved.

By the intimate contact of the plunger 29a with the body of the solenoid 29, the attraction $f_1'$ of the solenoid 29 is increased and overcomes the biasing force $f_4'$ of the spring 30 and thus, thereafter, the plunger 29a is held in its intimate contact state. In this state, the latch member 41 can pivot clockwise and therefore, when the webbing W is somewhat rewound and comes onto the first cam surface 13, the latch pawl 41d becomes engaged with a tooth of the ratchet wheel 6 (the state of FIG. 19). Due to this engagement, the take-up force of the take-up spring 3 is no longer transmitted to the webbing W and thus, the seat occupant can enjoy comfortable belt wearing.

The operation thereafter is similar to that of the first embodiment. When the seat occupant releases the engagement between the tang and the buckle, the switch of the solenoid 29 is opened and the attraction $f_1'$ of the solenoid becomes null, while the biasing force $f_3'$ of the spring 44 is not acting on the plunger 29 and therefore, the plunger 29a is pushed back from the body of the solenoid 29 toward the stopper 1c by the spring 30. At this time, the bent end 41g of the leg portion 41e of the latch member 41 is pushed back counter-clockwise and therefore, the engagement between the latch pawl 41d and a tooth of the ratchet wheel 6 is released (the state of FIG. 20) and the take-up of the webbing becomes possible.

In the above-described embodiments, the plunger attraction of the solenoid is assisted by the spring force through the arm, but it is also possible to increase the capacity of the solenoid and omit the assistance by the spring force through the arm.

A third embodiment which will hereinafter be described is an embodiment in which the assistance by the spring force through the arm is omitted. In the third embodiment, members similar to those in the previous embodiments are given similar reference characters and need not be described.

Figure 21:
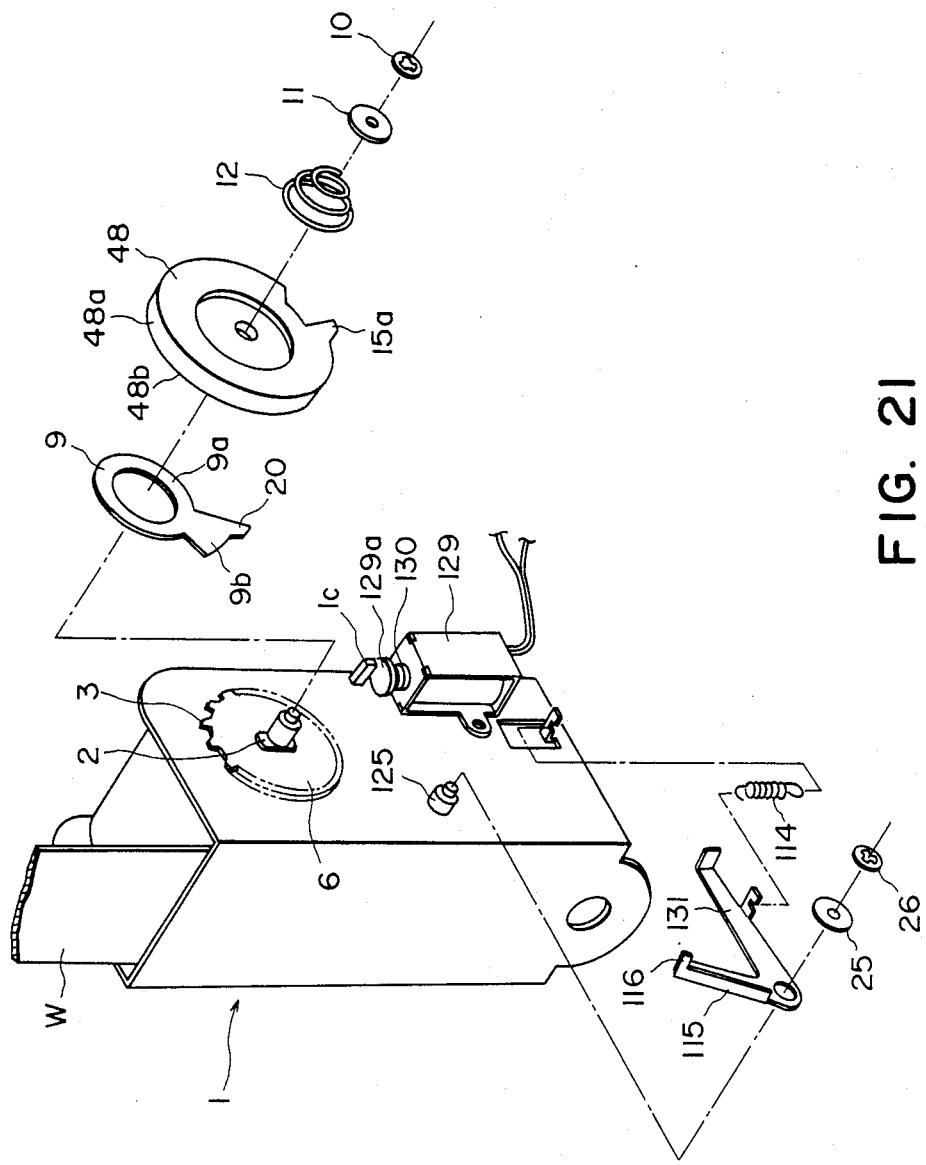
FIG. 21 is an exploded perspective view of a third embodiment of the present invention.

The essential differences between the third embodiment and the other embodiments lie in the control plate 48, the latch member 15 and the method of setting the force relation for controlling the latch member 15, and these will hereinafter be described in detail with reference to FIGS. 21 to 29. In FIG. 21, the control plate 48 is pressed against the ratchet wheel 6 by a conical spring 12 disposed between the washer 11 held on the shaft by the snap ring 10 and the control plate 48 and tends to rotate with the take-up reel 2 due to the friction force with respect to the ratchet wheel as long as a blocking force does not act. Where the base 1 is vertically mounted, the clutch plate 9 sandwiched between the ratchet wheel 6 and the control plate 48 is not substantially in friction engagement with the ratchet wheel 6 nor with the control plate 48. The clutch plate 9 comprises a central annular portion 9a, a leg portion 9b divergently protruding radially outwardly from the outer periphery of the central annular portion, and a projection 20 at one end of the leg portion 9b.

The groove in the inner side surface 48a of the control plate 48 is somewhat deeper than the thickness of the clutch plate 9, and this groove, as shown in FIG. 22, is comprised of an annular portion for receiving the annular portion 9a of the clutch plate 9 thereinto and a leg portion 17 for receiving the leg portion 9b thereinto so that the clutch plate 9 can relatively rotate by a predetermined amount.

The cam surface 48a of the control plate 48 comprises various cam portions for controlling a latch member 115 biased in a direction to mesh-engage the ratchet wheel 6 by a spring 114 which is first biasing means with a biasing force $f_2''$. These cam portions, as shown in FIG. 22, comprise a first cam surface 13 adapted to be engaged with the protrusion 116 of the latch member 115 to thereby enable the latch member 115 to mesh-engage the ratchet wheel 6, a second cam surface 14 continuous to the first cam surface 13 and disabling the latch member 115 to mesh-engage the ratchet wheel 6, a third cam surface 15 circumferentially spaced apart from the second cam surface 14 and lying radially outwardly of the first cam surface 13 and having a projection 15a at one end thereof, and a fourth cam surface 16 lying radially inwardly of the third cam surface 15 and continuous to the first cam surface 13 and keeping the latch member 115 in an unengageable state.

The leg portion 9b of the clutch plate 9 has a cam surface 19 continuous to the second cam surface 14 of the control plate 48, and that side of this cam surface 19 which is adjacent to the third cam surface 15 of the control plate 48 provides the projection 20. This projection 20 gradually protrudes from the cam surface 19 and sharply falls radially inwardly on the third cam surface 15 side. The fourth cam surface 16 of the control plate 48 somewhat extends also into the leg portion 17 of the groove and is adapted to receive the protrusion 116 of the latch member 115 when it drops from the third cam surface 15.

The latch member 115 is mounted on a shaft portion 125 projected from the base 1 by means of a snap ring 26 and a washer 25 for pivotal movement about the shaft portion 125. On the other hand, a solenoid 129 is disposed on the base 1, and a plunger 129a biased outwardly of the solenoid by a spring 130 which is second biasing means with a biasing force $f_4''$ is disposed at a location whereat it is engageable with the arm portion 131 of the latch member 115 which is not formed with the protrusion 116. This arm portion 131 constitutes auxiliary means. The jump-out of the plunger 129a outward of the solenoid is controlled at a suitable location by a stopper 1c secured to the base 1. When the attraction of the plunger 129a by the solenoid 129 is $f_1''$, each force is set so that $f_1''+f_2''>f_4>f_1''$, $f_2''$ immediately after the engagement between the tang and the buckle.

Although not shown, the shown retractor is provided with an emergency locking mechanism for sensing any speed change of the vehicle greater than a predetermined value and preventing the rotation of the take-up reel 2 in the webbing draw-out direction and safely restraining the webbing wearer.

Operation of the present embodiment will hereinafter be described on the basis of the above-described construction.

The manner in which the whole amount of the webbing W has been taken up onto the take-up reel 2 and the webbing is in its stand-by state is shown in FIG. 23, and in this state, the clutch plate 9 has its leg portion 9b pushed by the protrusion 116 of the latch member 115 and striking against that side of the leg portion 17 of the groove of the control plate 48 which is adjacent to the second cam surface 14, and the rotation of the two members 48 and 9 in the take-up direction, i.e., the clockwise direction, is prevented by the protrusion 116.

Figure 29:
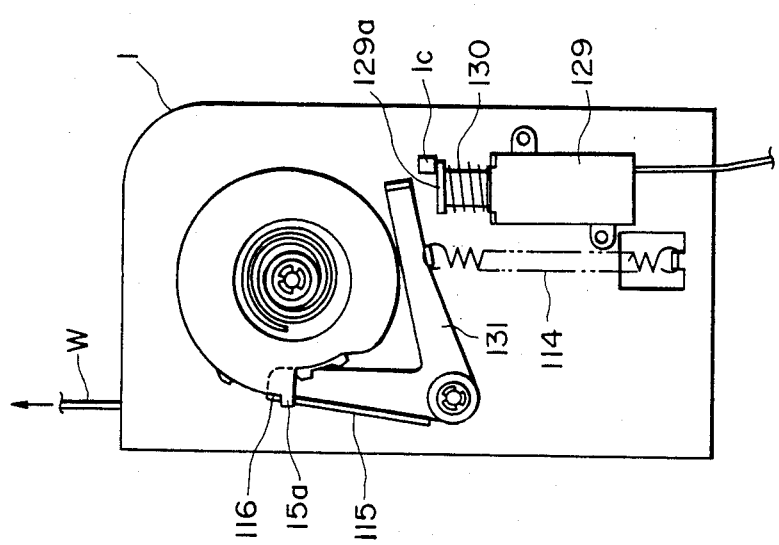
FIG. 29 is a side view corresponding to the state of FIG. 22.

As the seat occupant draws out the webbing W from the state of FIG. 23 to wear the webbing, the control plate 48 begins to rotate counter-clockwise with the take-up reel 2, and the protrusion 116 of the latch member 115 traces the fourth cam surface 16, the outer portion of the first cam surface 13 which keeps the non-engaged position with respect to the ratchet wheel 6, i.e., the non-latching position, and the second cam surface 14 in the named order. In this case, the solenoid 129 is in its non-energized state and therefore, the plunger 129a is in a position wherein it has jumped out with the aid of the spring force of the spring 130 (see FIG. 29), and accordingly, the latch member 115 cannot assume its latching position and does not trace the first cam surface 13 because the arm portion 131 bears against the plunger 129a. Thus, the protrusion 116 of the latch member 115 comes to the third cam surface 15 of the control plate 48 via the cam surface 19 and projection 20 of the clutch plate 9 already rotated to the third cam surface 15 side due to gravity, and finally becomes engaged with the projection 15a as shown in FIG. 22.

Where the base 1 is mounted in a rightwardly or leftwardly inclined position as viewed in FIG. 21, the clutch plate 9 remains held in its position of FIG. 23 by the friction force between the clutch plate 9 and the control plate 48 or the ratchet wheel 6, but if the webbing W is further drawn out from the position in which the protrusion 116 of the latch member 115 bears against the projection 20 of the clutch plate, the clutch plate 9 is pushed away toward the third cam surface 15 and operates in the same manner as described previously. In this state, even if the webbing W is further drawn out, only the take-up reel 2 rotates counter-clockwise and the control plate 48, the clutch plate 9 and the latch member 115 remain unchanged. The state as seen from outside is shown in FIG. 29.

When the webbing wearer puts on, for example, the buckle, the solenoid 129 is first energized and, when he leans back in his seat and assumes a regular seated posture thereafter, the webbing W is somewhat rewound. Thereupon, the control plate 48 and the clutch plate 9 rotate clockwise with the take-up reel 2 and the protrusion 116 of the latch member 115 bears against the projection 20 of the clutch plate 9. Thus, the clutch plate 9 is subjected to a counter-clockwise force and rotates counter-clockwise against gravity, whereby a path from the third cam surface 15 to the fourth cam surface 16 is opened and the protrusion 116 drops onto the fourth cam surface 16. Thus, the state of FIG. 23 is restored.

Subsequently, when the webbing W is somewhat drawn out to endow the webbing with some slack, the control plate 48 rotates counter-clockwise with the take-up reel 2, and the protrusion 116 of the latch member 115 drops from the fourth cam surface 16 onto the first cam surface 13 as shown in FIG. 25. That is, by this point of time, the solenoid 129 has been energized to attract the plunger with an attraction $f_1''$, but by only this force, it cannot attract the plunger 129a against the spring force $f_4''$ of the spring 130, whereas when the arm portion 131 of the latch member 115 comes into engagement with the plunger 129a and the spring force $f_2''$ of the spring 114 is also applied as an auxiliary force to the plunger 129a when the protrusion 116 drops onto the first cam surface 13, the plunger 129a is attracted because the sum of the attraction $f_1''$ and the auxiliary force $f_2''$ is set so as to be greater than the force $f_4''$ of the spring 130. Accordingly, if seen from outside, the latch member 115 becomes able to assume a latching position as shown in FIG. 28, and meshes with the ratchet wheel 6 to lock the rotation of the take-up reel 2 in the take-up direction.

Thus, the take-up force of the take-up spring is not applied to the webbing wearer, who can enjoy comfortable webbing wearing free of a sense of oppression.

It is possible to draw out the webbing W from the state of FIGS. 25 and 28, and as the webbing W is drawn out, the protrusion 116 of the latch member 115 shifts from the first cam surface 13 to the second cam surface 14 and further to the cam surface 15 of the clutch plate 9 and, when it shifts to the second cam surface 14, the latch member 115 becomes unable to mesh with the ratchet wheel 6 and the take-up force of the take-up spring is recovered. Accordingly, when the webbing draw-out force has become exhausted by this stage, the webbing W is gain taken up and the state of FIG. 25 is restored. That is, as long as the protrusion 116 of the latch member 115 remains short of the projection 20 of the clutch plate 9 as shown in FIG. 26, the original webbing wearing state is restored if the draw-out force is exhausted, and the webbing wearer can effect his forwardly leaning movement or the like in a predetermined range. In this case, even if the latch member 115 is brought to its non-latching position and the arm portion 131 separates from the plunger 129a, the force with which the plunger 129a already attracted against the force of the spring 130 is kept in this state may be smaller than the force with which the plunger 129a begins to be attracted and therefore, the plunger 129a is ketp in its attracted state which is a first position.

However, when via the state of FIG. 26, the webbing W is drawn out to such a degree that as shown in FIG. 27, the protrusion 116 of the latch member 115 goes over the projection 20 of the clutch plate 9 and comes to the third cam surface 15 of the control plate 48, the state of FIG. 25 can no longer be restored, and if the draw-out force is exhausted at this point, the state of FIG. 23 will be restored via the state of FIG. 24 and the take-up reel will become ready to take up the whole amount of the webbing.

However, when it is desired to rewind the whole amount of the webbing, it is not necessary to effect such a cumbersome webbing operation, but the solenoid 129 may be deenergized simply by disengaging the buckle, for example. Thus, the attraction to the plunger 129a by the solenoid 129 becomes null and further, because the force $f_4''$ of the spring 130 is set to a value greater than the force $f_2''$ of the spring 114, the plunger 129a jumps out to a second position in which it strikes against the stopper 32 with the aid of the force $f_4''$ of the spring 130 against the force $f_2''$ of the spring 114. At this time, the arm portion 131 of the latch member 115 is pushed up and the latch member 115 comes to its non-latching position, whereby the take-up force of the take-up spring is recovered. Thus, again, the state of FIG. 23 is directly restored from the state of FIG. 25 and the next webbing wearing is waited for.

In the above-described embodiments, the switch has been described as being mounted in the buckle, but of course, it may be a door switch which senses the opening-closing of the door, a switch adapted to operate by sensing the speed of the vehicle, or a switch manually operable by the seat occupant.

Further, the first control means has been described as using a control plate and a clutch plate, but alternatively, it may be a single cam plate. Also, the latch member has been described as moving to the second position when the solenoid is deenergized, but alternatively, design may be made such that the latch member moves to the second position when the solenoid is energized.

I claim:

1. A tension locking mechanism of a retractor comprising a webbing take-up reel rotatably supported on a base, a take-up spring for biasing said take-up reel in a webbing take-up direction, a ratchet member formed integrally with said take-up reel, a latch member adapted to assume a latching position in which it is engaged with said ratchet member and prevents rotation of said take-up reel in the webbing take-up direction and a non-latching position in which it is not engaged with said ratchet member and permits rotation of said take-up reel, first control means responsive to the draw-out and take-up of webbing to control said latch member so as to move between said latching position and said non-latching position, and second control means for bringing said latch member to said non-latching position and holding it in said non-latching, position, characterized in that said second control means comprises a solenoid adapted to be energized by sensing a predetermined movement of a seat occupant, a plunger adapted to assume a proximate position and a spaced apart position relative to said solenoid and to receive an attraction $f_1$ from said spaced apart position to said proximate position upon energization of said solenoid, biasing means for biasing said plunger to said spaced apart position with a biasing force $f_4$ against said attraction, and auxiliary means for sensing the draw-out of a predetermined amount of the webbing after the belt wearing and imparting to said plunger an auxiliary force $f_3$ toward said proximate position to thereby bring said plunger to said proximate position, and when said solenoid is deenergized, said biasing means pushes said plunger from said proximate position back to said spaced apart position, whereby said plunger is brought into engagement with said latch member which in turn is brought to said non-latching position, and further characterized in that said latch member is biased toward said latching position by a spring with a biasing force $f_2$ and the relation between said forces is $f_1 + f_3 > f_4 > f_1, f_2, f_3$.

2. A tension locking mechanism according to claim 1, characterized in that said ratchet member is a ratchet wheel secured to said take-up reel and having a plurality of teeth on the outer periphery thereof, said latch member comprises an arm portion having a pawl meshing with a tooth of said ratchet wheel and a leg portion engaged with said plunger, said arm portion being normally biased by said spring in a direction to be engaged with said ratchet wheel, and said first control means comprises a control plate frictionally engaged with said ratchet wheel and having on the outer periphery thereof a cam surface against which the pawl of said latch member bears and a clutch plate rotatable in a predetermined range relative to said control plate, said control plate being adapted to guide the pawl of said latch member and cause said pawl to mesh with a tooth of said ratchet member in a predetermined position.

3. A tension locking mechanism according to claim 2, characterized in that said auxiliary means comprises cam means formed integrally on said control plate and having a second cam surface on the outer periphery thereof, a first arm adapted to follow said second cam surface and pivotably supported on the base, a second arm engageable with said plunger, and a second spring provided between said first arm and said second arm and biasing said second arm so as to press said plunger toward its proximate position.

4. A tension locking mechanism according to claim 3, wherein said second cam surface moves the first arm relative to the second arm between a first position where relative displacement is maximum and a second position where the relative displacement is minimum, said auxiliary force $f_3$ is acted by the second spring on the plunger through the second arm in said first position, and when the latch member assumes the latching position, the first arm is brought to the second position where said auxiliary force $f_3$ does not act on the plunger.

5. A tension locking mechanism according to claim 2, characterized in that said auxiliary means comprises cam means formed integrally on said control plate and having a second cam surface on the outer periphery thereof, an arm adapted to follow said second cam surface and pivotably supported on the base and engageable with said plunger, and a second spring for biasing said arm by said auxiliary force $f_3$ so as to press said plunger toward its proximate position.

6. A tension locking mechanism according to claim 5 wherein said second cam surface moves said arm between a first position where the arm may effect acting on the plunger with said auxiliary force $f_3$ and a second position where the arm may not act on the plunger, and the arm is brought to the second position when the latch member assumes the latching position.

7. A tension locking mechanism of a retractor having a webbing take-up reel rotatably supported on a base, a take-up spring for biasing said take-up reel in a webbing take-up direction, a ratchet member formed integrally with said take-up reel, a latch member adapted to assume a latching position in which it is engaged with said ratchet member and prevents the rotation of said take-up reel in the webbing take-up direction and a non-latching position in which it is not engaged with said ratchet member and permits rotation of said take-up reel, first control means responsive to the draw-out and take-up of webbing to control said latch member so as to move between said latching position and said non-latching position to thereby enable said latch member to assume said latching position after a predetermined series of webbing wearing operations, and second control means for sensing a predetermined webbing removing operation and forcibly bringing said latch member to said non-latching position, said latch member being biased toward said latching position by first biasing means, said second control means comprising a solenoid adapted to be energized by a predetermined webbing wearing operation and deenergized by said predetermined webbing removing operation, a plunger adapted to receive a force from said solenoid and assume a first position to permit said latch member to assume said latching position when said solenoid is energized and to assume a second position to cause said latch member to assume said non-latching position when said solenoid becomes deenergized, second biasing means for biasing said plunger toward said second position, and auxiliary means for imparting an auxiliary force which causes the biasing force of said first biasing means to act on said plunger till after said predetermined series of webbing wearing operations and tries to bring said plunger to said first position, and wherein when said force which said plunger receives from said solenoid is $f_1''$ and the biasing force of said first biasing means is $f_2''$ and the biasing force of said second biasing means is $f_4''$, the relation that $f_1'' + f_2'' > f_4'' > f_1''$, $f_2''$ is satisfied.

* * * * *